US007249029B2

(12) United States Patent
Martin et al.

(10) Patent No.: US 7,249,029 B2
(45) Date of Patent: Jul. 24, 2007

(54) METHOD OF USING A COMPUTERISED ADMINISTRATION SYSTEM TO ADMINISTER LICENSING OF USE OF COPYRIGHT MATERIAL

(75) Inventors: Christopher Vandeleur Martin, London (GB); Christina Maria Schönleber, Kent (GB)

(73) Assignee: The Mechanical Copyright Protection Society Limited (GB)

( * ) Notice: Subject to any disclaimer, the term of this patent is extended or adjusted under 35 U.S.C. 154(b) by 979 days.

(21) Appl. No.: 09/859,219

(22) Filed: May 16, 2001

(65) Prior Publication Data

US 2002/0173976 A1 Nov. 21, 2002

(51) Int. Cl.
*G06Q 99/00* (2006.01)
(52) U.S. Cl. .......................................................... 705/1
(58) Field of Classification Search ...................... 705/1
See application file for complete search history.

(56) References Cited

U.S. PATENT DOCUMENTS

| 5,553,143 | A | * | 9/1996 | Ross et al. ..................... 705/59 |
| 5,675,734 | A | | 10/1997 | Hair ....................... 395/200.01 |
| 5,679,911 | A | * | 10/1997 | Moriyama et al. ............. 84/601 |
| 5,765,152 | A | * | 6/1998 | Erickson .......................... 707/9 |
| 5,809,144 | A | | 9/1998 | Sirbu et al. .................... 380/25 |
| 5,892,900 | A | | 4/1999 | Ginter et al. .................. 726/26 |
| 5,895,876 | A | * | 4/1999 | Moriyama et al. ............. 84/609 |
| 5,898,777 | A | | 4/1999 | Tycksen, Jr. et al. ........... 380/4 |
| 5,900,608 | A | * | 5/1999 | Iida ............................. 235/381 |
| 5,991,876 | A | * | 11/1999 | Johnson et al. .............. 713/200 |
| 6,009,401 | A | * | 12/1999 | Horstmann ..................... 705/1 |
| 6,185,683 | B1 | | 2/2001 | Ginter et al. ................. 713/176 |
| 6,226,618 | B1 | | 5/2001 | Downs et al. ................... 705/1 |
| 6,263,313 | B1 | | 7/2001 | Milsted et al. .................. 705/1 |
| 6,263,318 | B1 | | 7/2001 | Kimura et al. ................ 705/27 |
| 6,331,865 | B1 | | 12/2001 | Sachs et al. ................. 345/776 |

(Continued)

FOREIGN PATENT DOCUMENTS

JP 2001078266 A * 3/2001

(Continued)

OTHER PUBLICATIONS

"Sony Takes Digital System To Stores," Billboard, v111, n25, p. 1+, Jun. 19, 1999.*

(Continued)

*Primary Examiner*—Jonathan Ouellette
(74) *Attorney, Agent, or Firm*—Theodore M. Magee; Westman, Champlin & Kelly, P.A.

(57) ABSTRACT

The present invention relates to a method of using a computerised administration system to administer licensing of use of copyright material. The method comprises an administrator storing in a database of the computerised administration system information regarding copyright material available for license, said information having been supplied by a plurality of licensors and said information including identification information identifying the copyright material and associated licensors and licence information specifying terms and conditions of licenses offered in respect of the copyright material by the licensors. The method further comprises a plurality of applicants for licences to use the copyright material each using licensee computer apparatus to access and interrogate the database of the computerised administration system to determine what licence(s) is/are required for a particular use of copyright material and what terms and conditions are attached to the relevant licence(s).

22 Claims, 6 Drawing Sheets

U.S. PATENT DOCUMENTS

| | | | |
|---|---|---|---|
| 6,343,280 B2* | 1/2002 | Clark | 705/55 |
| 6,345,256 B1 | 2/2002 | Milsted et al. | 705/1 |
| 6,385,596 B1* | 5/2002 | Wiser et al. | 705/51 |
| 6,816,596 B1* | 11/2004 | Peinado et al. | 380/277 |
| 6,868,403 B1* | 3/2005 | Wiser et al. | 705/51 |
| 2001/0047515 A1* | 11/2001 | Schreer | 725/20 |
| 2002/0002543 A1* | 1/2002 | Spooren et al. | 705/57 |
| 2002/0052933 A1* | 5/2002 | Leonhard et al. | 709/219 |
| 2002/0077988 A1* | 6/2002 | Sasaki et al. | 705/59 |
| 2003/0163431 A1 | 8/2003 | Ginter et al. | 705/64 |
| 2004/0064417 A1* | 4/2004 | Stefik et al. | 705/52 |
| 2004/0220881 A1* | 11/2004 | Powell | 705/59 |

FOREIGN PATENT DOCUMENTS

| | | |
|---|---|---|
| WO | WO 98/10381 | 3/1998 |
| WO | WO 99/13398 | 3/1999 |

OTHER PUBLICATIONS

U.S. Appl. No. 09/387,930, filed Sep. 1, 1999, Hill et al.

* cited by examiner

METHOD OF USING A COMPUTERISED ADMINISTRATION SYSTEM TO ADMINISTER LICENSING OF USE OF COPYRIGHT MATERIAL

The present invention relates to a method of using a computerised administration system to administer licensing of use of copyright material.

The present invention will be discussed primarily with reference to the licensing of copyright works and sound recordings, but should not be considered limited to the licensing of only such material.

The traditional processing of licensing in the music industry is complex. An applicant for a licence must understand and seek a licence taking account of different types of music content, different rights which exist in the content, the ownership and/or control of the rights, the territorial regimes governing licensing as well as other varied and complex compliance and administrative issues. For instance, the following are all treated differently for licensing purposes: compositions of musical works;
a sound recording which incorporates a work or works;
a performance incorporated within the sound recording;
a graphic representation of musical scores and lyrics; and audio-visual creations.

The Intellectual Property rights in a musical work can also be licensed independently and separately for different restricted acts. Taking the United Kingdom as a example there are seven rights usually associated with musical compositions:
1. The right to perform a work in public;
2. The right to broadcast the work;
3. The right to include the work in a cable program service;
4. The right to copy the work;
5. The right to issue copies of a work to the public;
6. The right to adapt the work; and
7. The right to lend copies of the work.

A sound recording of the musical composition will itself have the same rights, with the exception of the adaptation rights. Each of the rights are subject to different types of ownership and/or control and are administered by different types of organisations in different ways. Furthermore, the distinctions themselves vary between Europe, the United Kingdom and North America.

In the United Kingdom, a song writer/composer usually assigns his/her performing rights (the right to broadcast the work and to include the work in a cable program service) directly to a performing rights organisation in his or her territory with the effect that the performing rights organisation becomes the owner of the performing right in its member's work. In most territories there is only one performing rights organisation, but in the United States there are three and in the United States the writer/composer does not usually assign the copyright in his work to the performing rights organisation but enters into a non-exclusive representation agreement with it. By either assigning rights or entering into a representation agreement the song writer/composer gives the performing rights organisation the authority to license others to do some of the restricted acts comprised in the performing rights in return for royalties. The royalties are collected by a performing rights association and then distributed to its members according to its rules and regulations.

In the USA and in the UK similar systems exist for "mechanical" exploitation, i.e. the copying of works and the issuing of copies to the public. Quite often the publishers will administer these rights themselves. The licensing of musical works and/or recordings into e.g. advertisements is usually performed on a work by work, use by use basis. Often this type of licence will require the publisher to obtain permission from the writer/composer of the work and would entail a degree of negotiation before a suitable licence is agreed. For more straightforward or standardised licensing, mandates of varying breadths are given to mechanical rights organisations or collecting societies for the purposes of collective licensing, administration and control. The mechanical rights organisations may also have the right to license on standard terms musical works commonly referred to as "back catalogue" i.e. slightly older songs which might well be included in, for instance, a compilation album.

In Europe, outside the United Kingdom, there is commonly operated a "droit d'auteur" system. Under such a system mechanical rights in the composition are owned by the mechanical rights organisation much in the same way as a performing right and the publisher becomes a member of the mechanical rights organisation. The mechanical rights organisation negotiates agreements with those who wish to distribute music and then collects and distributes the mechanical royalties to both the composer and publisher in accordance with agreements between them.

Sound recording rights are owned by the person making the sound recording, normally a record company. These rights tend to be administered by the record companies directly although in some territories the right to license a public performance for broadcasting of a sound recording is administered by specialist rights organisations acting on behalf of the copyright owner. Phonographic Performance Limited in the United Kingdom is an example of such an organisation.

From the above it will be appreciated that there are different legal and administrative structures internationally and each copyright territory is capable of having a different owner for each of the rights. Certainly the Licensor of a musical composition is likely to be different for exploitation in each territory. This is because publishers tend to sub-contract work to each other in order to exploit and administer catalogues of work on a country by country basis. Also, rights organisations have established a structure of reciprocal agreements on a territorial basis. The situation arises from a traditional national approach to writer representation, licence terms and conditions and the monitoring and control of exploitation.

With the Internet now offering a worldwide distribution medium, the traditional territorial-based procedures and systems are becoming unworkable. Obtaining permission to offer 50 tracks for download in the United States alone has necessitated in one instance over 375 letters in order to gain clearance.

With the distribution of music via the Internet the checking of sales and usage becomes more complicated than has been the case in the past.

The present invention provides a method of using a computerised administration system to administer licensing of use of copyright material, the method comprising:

an administrator storing in a database of the computerised administration system information regarding copyright material available for license, said information having been supplied by a plurality of licensors and said information including identification information identifying the copyright material and associated licensors and licence information specifying terms and conditions of licenses offered in respect of the copyright material by the licensors; and a plurality of applicants for licences to use the copyright material each using licensee computer apparatus to access and interrogate the database of the computerised administration system to determine what licence(s) is/are required for a particular use of copyright material and what terms and conditions are attached to the relevant licence(s).

The present invention provides "one-stop-shop" on-line licensing in the form of a service provider who meets the needs of record companies and broadcasters and other licensees by providing a rapid, centralised and cost-effective service for obtaining appropriate licences.

A preferred embodiment of the present invention will now be described with reference to the accompanying drawings, in which.

Figure 1:
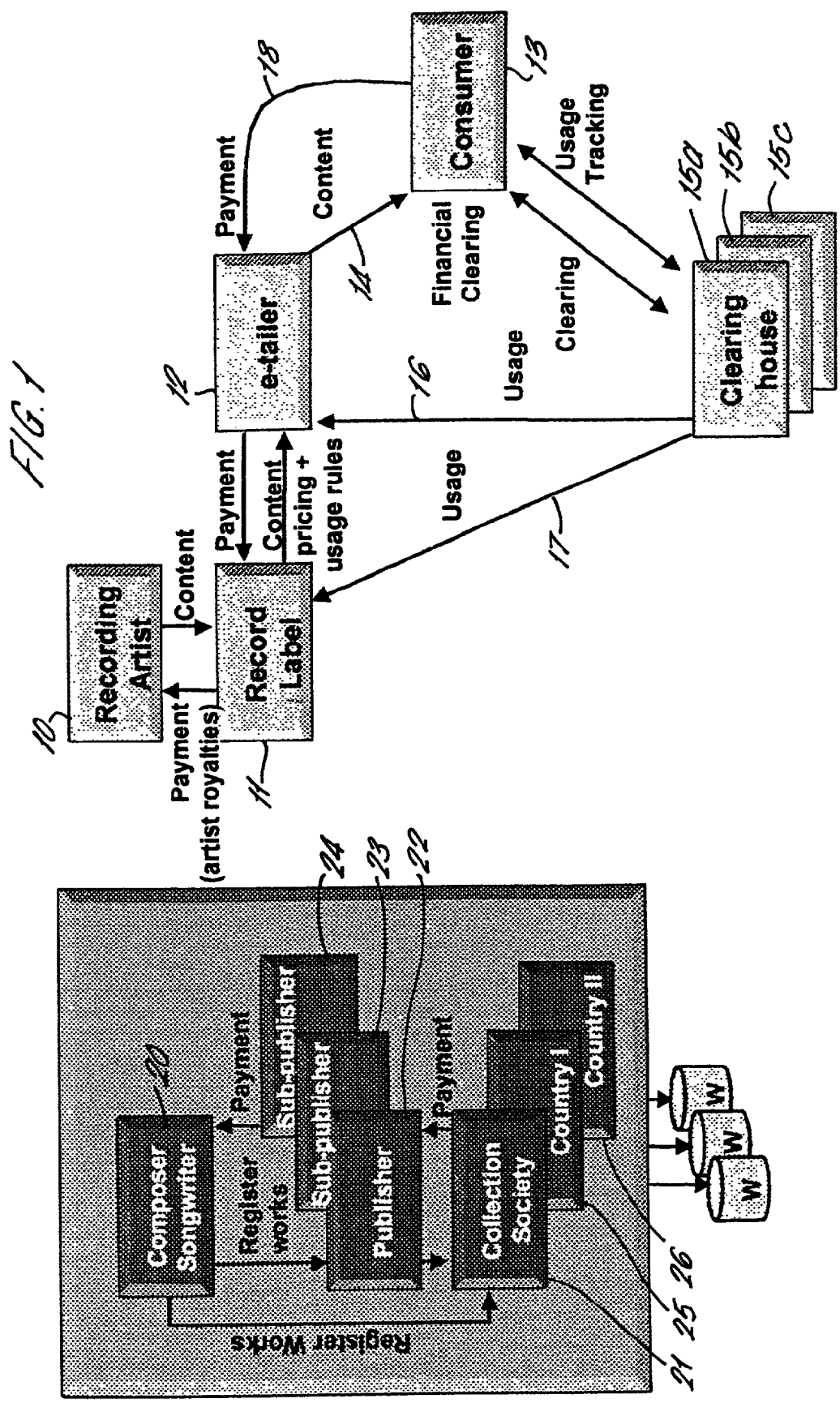
FIG. 1 is a schematic representation showing a current electronic retailing arrangement.

Turning first to FIG. 1, there can be seen in the figure a schematic diagram showing how on-line digital sound recordings are currently offered to the public. In the figure the infrastructure for supplying digital sound recordings to the public is shown on the right-hand side.

In the Figure there can be seen a recording artist 10 who provides content to a record label 11 (otherwise known as a record company). The record label 11 provides the content to an electronic retailer (or e-tailer)12. A contract is concluded between the e-tailer 12 and the record label 11. The consumer 13 buys a sound recording from the e-tailer 12. The sound recording is downloaded in a digital download to the consumer 13. Typically the e-tailer 12 will run a website accessible via the Internet and the consumer 13 will use a personal computer to access the website 12 using web-browser software and then download content to the local hard disk of the personal computer of the consumer 12. The downloading process is shown by the arrow 14. The consumer 13 pays the e-tailer 12 for the downloaded content, typically using a credit card. The e-tailer 12 will typically not run its own credit card clearing system and will employ the services of a clearing house 15a (three clearing houses 15a, 15b and 15c are shown in the figure). The clearing house 15a will accept and clear the credit card payments on behalf of the e-tailer 12 and will transfer the payment to the e-tailer 12 (indicated by the line 16). The clearing house 15a can operate to monitor use of the sound recording and report use both to the e-tailer 12 and to the record label 11. The reporting of the use to the e-tailer 12 is shown by the line 16. The reporting of the use to the record label 11 is shown by the line 17.

Alternatively, payment may be made directly by the consumer 13 to the e-tailer 12 and this is shown by the line 18.

The traditional structure for ownership of copyright in the musical recordings is shown in the left-hand side of the Figure. The collecting society 21 and/or publisher 22 will hold details of the works of the composers/songwriters 20. The publisher 22 may sub-contract publishers 23 and 24 to act in other territories. The collection society 21 may have agreements with other collection societies 25 and 26 in other countries. The publishers 22, 23, 24 may either assign copyright or enter into an agency agreement with the collection societies 21, 25, 26 and payment is collected by the collecting societies 21, 25, 26 and passed back to the publishers 22, 23, 24 or collected directly by the publishers 22, 23, 24, the publishers then passing the payment back to the composer/song writers 20. The collecting societies 21, 25, 26 may pass payments directly to the composer songwriter 20.

At present there is no solution that attempts to connect the two sides of the music industry together for the purposes of licensing content in an on-line context. This causes the difficulties which have been described already above.

Figure 2:
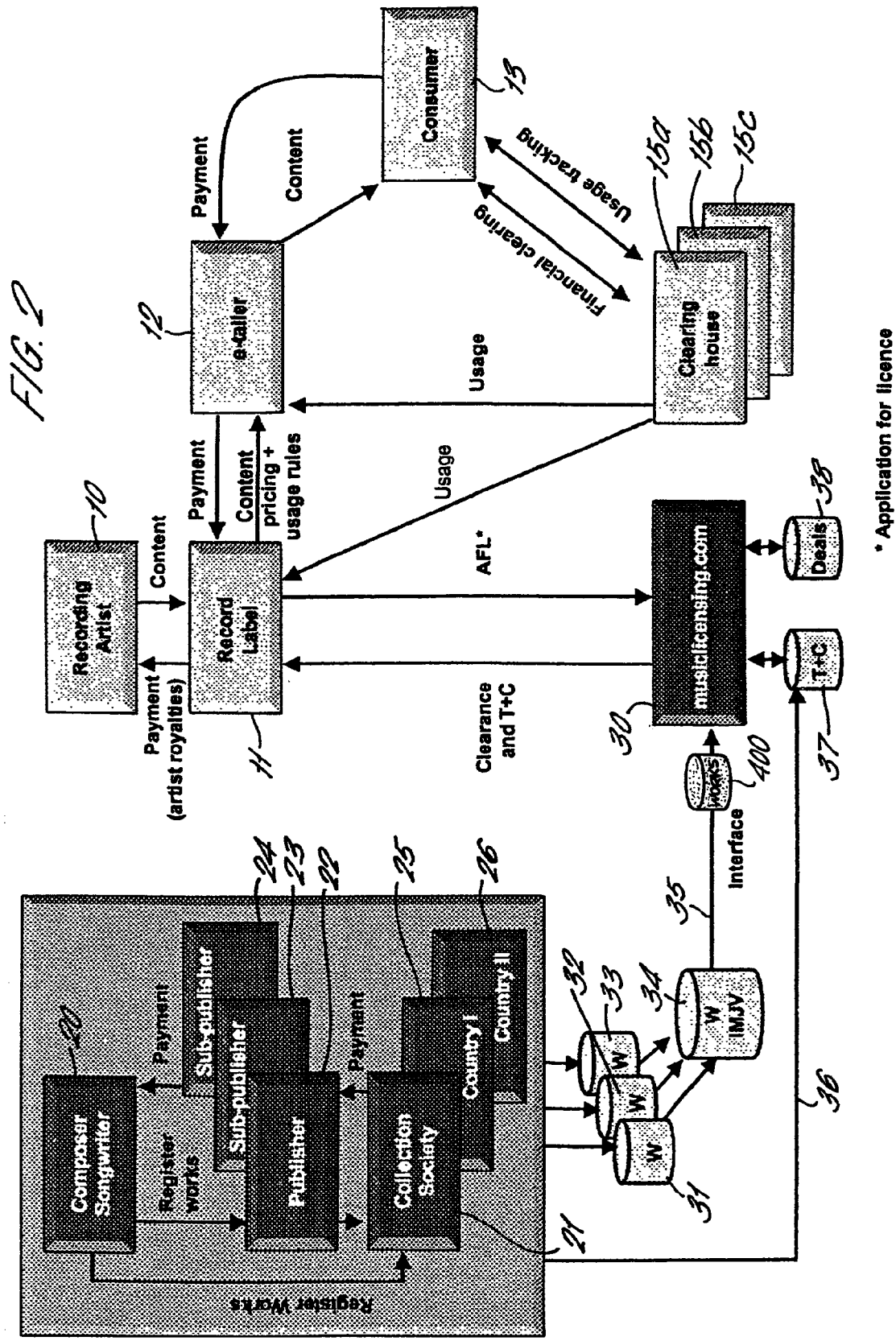
FIG. 2 is a diagram showing a first embodiment of the computerised administration system according to the present invention.

FIG. 2 shows a first embodiment of computerised administration system for administering licensing of copyright material, according to the present invention. The recording artist 10, the record label 11, the e-tailer 12, the consumer 13, the clearing house 15a all interact with each other in the way described previously in relation to FIG. 1. Also the composer/song writer 20, the collection society 21, 25 and 26 and the publishers 22, 23 and 24 all interact with each other as described previously in relation to FIG. 1.

In FIG. 2 there can be seen a computerised administration system shown schematically at 30. The computerised administration system 30 provides the link between the composer/song writers 20, the publishers 22, 23, 24 and the collection societies 21, 25 and 26 on the one hand and the record labels (e.g. 11) on the other.

In the method the copyright owners (the composers/song writers and/or the publishers) make available information regarding their musical works to the computerised administration system 30. Typically, each collection society 21, 25, 26 will have its own database of musical works, these databases being shown as 31, 32, 33. Recently there has been an initiative between several collection societies to create a new joint-venture database 34 which incorporates details of musical works recorded in all of the databases 31, 32, 33 of the collection societies. For the purposes of the preferred embodiment now described it is assumed that this database is operational and it can be seen that the large database 34 is connected via an electronic link 35 to the computerised administration system 30. Information from the joint venture database 34 is collected by a works database 400 of the computerised administration system. Information for the works database 400 will be collected from all applicable joint venture databases (only one database 34 is shown in FIG. 2) and/or directly from the databases of collection societies and/or publishers.

It can also be seen in FIG. 2 that the copyright owners and/or collection societies make available to the computerised administration system 30 their standard sets of licensing terms and conditions. The sets of licensing terms and conditions are transferred electronically via the line 36 to a database 37 of Terms and Conditions incorporated in the computerised administration system 30.

The computerised administration system 30 of the present invention has been designed bearing in mind the new ways in which musical works are exploited.

Delivery of music on-line usually follows one of the following routes:

1. Scheduled/preselected streaming—this is undertaken, for instance, by Internet radio stations broadcasting over the Internet.

2. Near-on-Demand—recordings of musical works are scheduled for streaming at specific times, sometimes with an element of consumer customisation.
3. Interactive listening—listeners are able to select specific recordings that they would like to hear, when and where they want to hear them, but the recordings are broadcast rather than being downloaded to local devices of the consumer.
4. Restricted Ownership—in one model recordings are downloaded to consumers with certain restrictions on use. Typically, these amount to a restriction on the number of times a musical recording can be played or to a period of time for which the musical recording is active.
5. Indefinite Ownership—in this model the consumers purchase a download of a musical file on a permanent basis.

Charging for the above-noted five different mechanisms of electronic delivery of music varies considerably. It is possible for content to be provided free to the consumer, e.g. for promotional purposes or paid for by e.g. advertising, or the content can be delivered through a subscription model. A pay per play charging model can be appropriate for any instance in which the user selects a recording to listen to but not to keep. Finally, buying of a download is appropriate for permanent acquisition of a recording.

It is possible for all of the methods of delivery of music and also the payment methods to be connected and interrelated. For instance, a subscriber listening to a streaming service may be offered the opportunity to purchase a download for storage on a permanent basis.

In order to cope with the different types of use and the different types of methods of payment it is envisaged that essentially four different types of licensing model could follow. These are as follows:

(a) Blanket Licence

This would be a licence granted in relation to a large catalogue of copyright works for use in high volume delivery situations such as broadcasts or web-cast streaming. Such a licence would be typically granted for a lump sum for a period of time. These sums are either negotiated in advance or based upon a formula taking account of total revenues, audience reach and/or audience share. This could apply for instance using the US Performing Rights system as an example, where a licensee has to find a number of different licensors in order to obtain a number of limited blanket licences (as described above) which together cover all the repertoire necessary for the delivery of a service.

(b) Use-by-Use Licence

In some instances licences are provided on a blanket basis insofar as the licensee is granted advance permission to exploit a large catalogue of music. The charging mechanism is typically related to the volume of use. An example might be a niche Top 40 e-caster offering a customised service to customers to have unlimited access to the year's Top 40 hits on a pay-by-play basis.

(c) Work-by-Work Licence

Perhaps the most complex type of licence—this is where each individual work is "cleared" in advance. This means that each composition must be identified at the time of recording in order for licence to be valid.

(d) Direct to Licensor

In certain cases standardised requests for use of a particular composition and/or sound recording would be channelled directly to the Licensor in order to allow individual negotiation to be conducted and permissions granted. Such licences can include so-called "sync" licences, e.g. licensing use of well-known musical works for particular advertisements.

The copyright owners or their authorised representatives will supply terms and conditions for each of the licence types (a),(b) and (c) above to the computerised administration system 30 which will then be stored in the database 37. It should be appreciated that the administrator operating the computerised administration system 30 is in no way the Licensor, it stores details of the terms and conditions of its licensor subscribers.

It can be seen in FIG. 2 that a record label 11 applies as a licence applicant to the administrator running the computerised administration system 30. The application is made electronically via a telecommunications network. It is envisaged that the computerised administration system 30 will be linked to a web site on the Internet and the record label 11 will use computer apparatus with web-browser software to access the website.

The computerised administration system will be set up to ask the licensors to specify terms and conditions information according to a standard format, so that the terms and conditions are easily stored and then easily recognised in licence application searches and understood in subsequent reviews by licence applicants.

Figure 5:
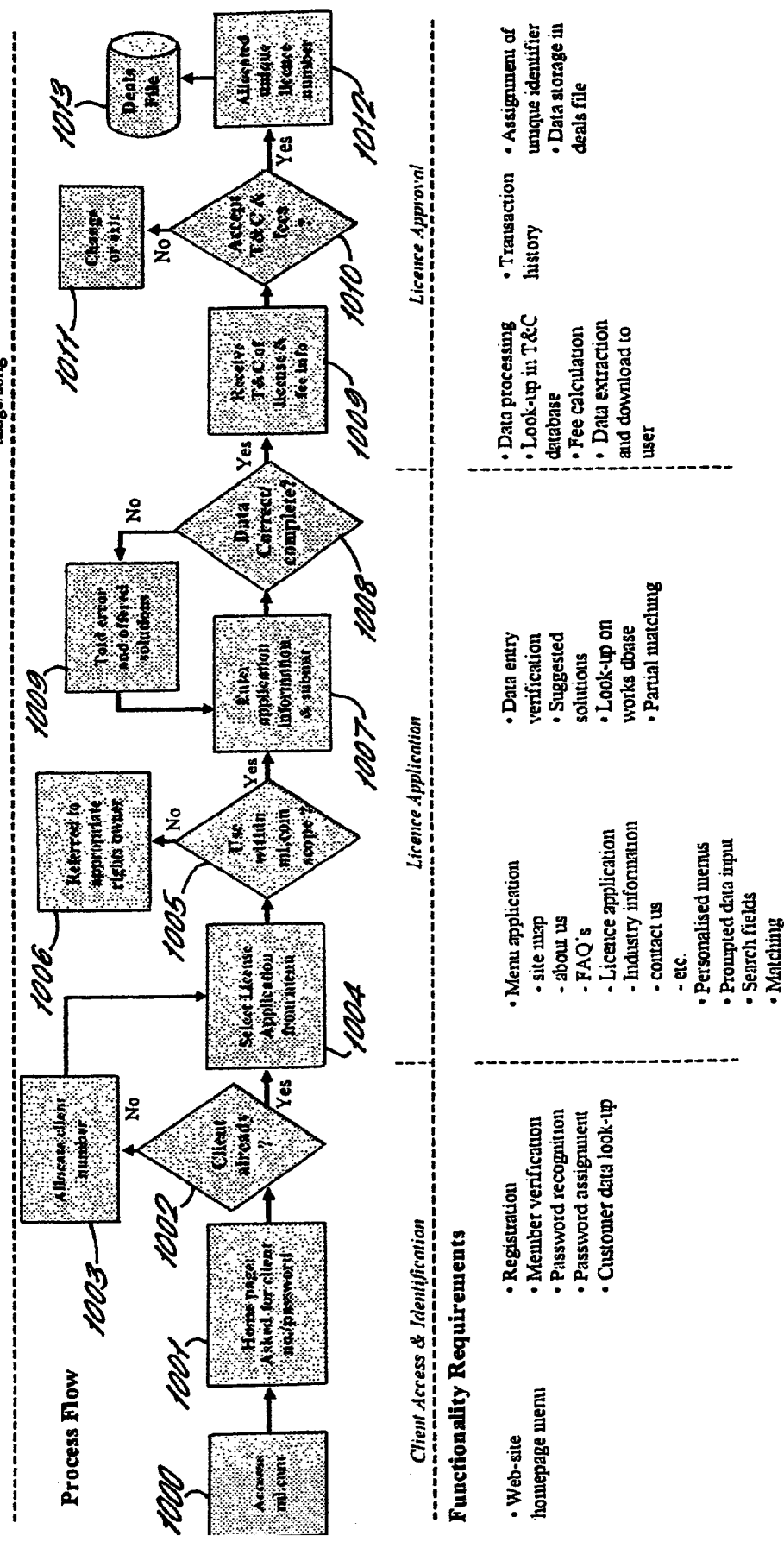
FIG. 5 is a flow chart showing the granting of a licence by a computerised administration system as shown in any of FIGS. 2 to 4.

The flow chart of FIG. 5 illustrates the procedure which occurs after a licence applicant, e.g., the record label 11, accesses the website. The step of accessing the website is shown at Step 1000. The record label 11 is then asked for a client number and password at Step 1001. If the record company 11 is not already a client then at Step 1002 the record company 11 is directed to the sub-routine illustrated at Box 1003 at which a client number is allocated. In this step the individual accessing the website is asked for his/her name and title as well as details of the company, contact details and then a password and client ID are issued. At this stage, creditworthiness of record companies may be checked. The system will only be open to subscribers and the administrator will select subscribers partly on the basis of credit-worthiness.

At Step 1004 the licence applicant is presented with a menu allowing searching of the database stored by the computerised administration apparatus 30. When a licence applicant is looking for licences on a copyright-by-copyright basis then the licence applicant will search in the database of identification information regarding copyright material to determine whether a licence for a particular use of copyright material can be obtained via the computerised administration system 30. Once the copyright material has been identified then the process passes on to stage 1005. Otherwise the applicant may wish to take a blanket licence (of all copyright material owned by a Licensor) for a particular territory and will specify a territory in the licence application menu. At stage 1005, the licence applicant is presented with licences which are available for the use of copyright material (or territory) in question. If standard licence terms are not available for the use envisaged by the licence applicant then the process goes to stage 1006 and the licence applicant is referred directly to the appropriate licensor. It is envisaged that this will be accomplished by transferring the licence applicant to a website run by the appropriate licensor. The licence application then terminates at this stage as far as the computerised administration system 30 is concerned.

If one or more appropriate licences is/are available then the process proceeds to stage 1007. The licence applicant is prompted to enter appropriate licence application information and is then asked to submit an application for a licence or for a plurality of licenses.

At stage 1008 the computerised administration system 30 verifies whether the information entered is correct and/or complete. If not, then the licence applicant is informed at Stage 1009 of the error and is asked to re-input information at Stage 1007.

When the correct information for the licence application has been input then the procedure moves on to stage 1009 when the licence applicant receives details of the terms and conditions available for the licence(s) requested and also details of fee rates. At this stage the computerised administration system 30 accesses the terms and conditions database 37 in order to provide the relevant information. It should be appreciated that e.g. a blanket licence application for a particular territory may result in the taking of a bundle of different licences. The system will act to aggregate and bring together all relevant licences.

At stage 1010 the licence applicant is asked to accept the specified terms and conditions and fee rates. If the terms and conditions are not acceptable then the process ends at Stage 1011. If the terms and conditions are acceptable then the process proceeds to Stage 1012 and a unique identifier is allocated to the licence(s) obtained and details regarding each licence including the relevant terms and conditions, the identity of the licence applicant, identity of the licensor and the unique identifier are stored at Stage 1013 in a database 38 of completed licences or deals. The single unique identifier can be subsequently used (as described later) to identify all the licences which were required in respect of a particular licenced use of copyright material.

It is envisaged that at stage 1003 a licensor may be notified electronically of the acceptance of licence terms by a licence applicant. Additionally and/or alternatively the deals database 38 will be accessible to the licensors via the website attached to the computerised administration system 30 so that the licensors can keep track of what licences have been granted for each part of their copyright material.

The licence application is established in such a way that it cannot easily be used to browse for what licences are available. Instead the licence applicant will be required to give full details of the sort of use which is envisaged and then will be informed what licence or licences is/are appropriate. Indeed, it is a great strength of the system that it will be able to determine for a particular use what licence(s) is/are required (in some instances quite a number of different licences will be required for a single use).

Figure 3:
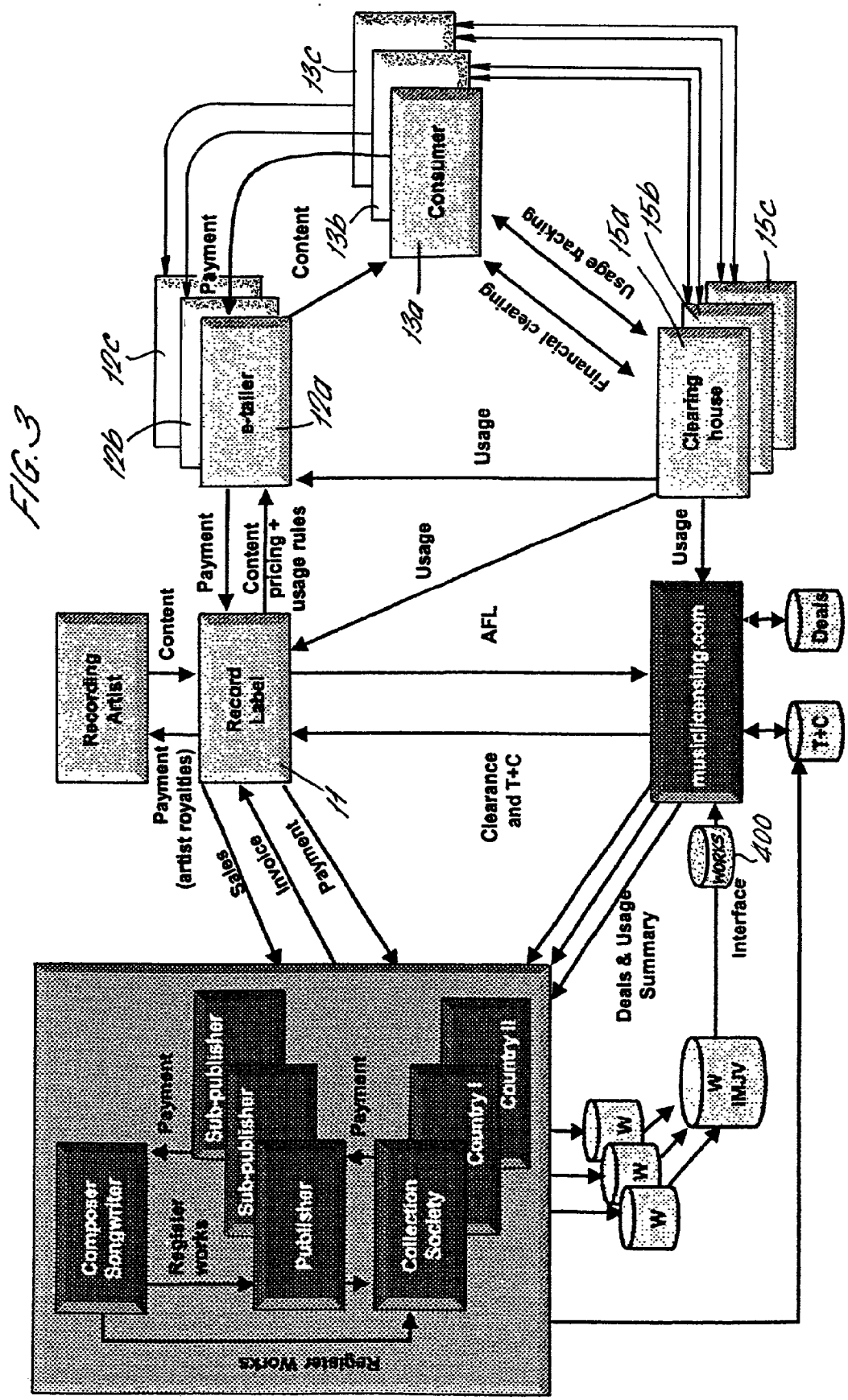
FIG. 3 is a schematic diagram showing a second embodiment of a computerised administration system according to the present invention.

In FIG. 3 a variation on the system previously described is illustrated. In this arrangement the record label 11 distributes recordings of music to a plurality of different e-tailers 12a, 12b, 12c who deliver recordings of music to a plurality of different consumers 13a, 13b, 13c. The different e-tailers 12a, 12b, 12c may, for instance, use different delivery systems, e.g. Liquid Audio, MP3, etc. A plurality of clearing houses 15a, 15b and 15c operate a tracking system to monitor use of licensed recordings of music and report the use of the recordings to the computerised administration system 30 by means of information sent digitally via the Internet. In the FIG. 3 arrangement it is envisaged that the unique licence identifier applicable to the licence used by the record label 11 of copyright material is incorporated by the record label 11 in all relevant digital files or transmissions or broadcasts. These files may for instance be digital downloads delivered to consumers for storage on the hard disks of personal computers.

The clearing houses 15a, 15b, 15c track the use of licensed copyright material and report the use to the computerised administration system 30.

The unique licence identifier allocated at the end of each licence application is embedded in e.g. digital files sold by the record label 11 and is noted by each clearing house 15a, 15b, 15c during its tracking operation and the information is relayed on to the computerised administration system 30. Thereby the computerised administration system 30 can ascertain how many instances of use of copyright material have been undertaken under each licence. This information is relayed on to the licensors. This can either be done immediately upon receipt, periodically or instead the information can be made available via the website attached to the computerised administration system 30 so that the licensors can access the website to monitor use.

In FIG. 3 it can be seen that sales are also reported by the record label 11 to the licensors, who then issue invoices for royalties and then receive payment. The sales figures provided by the record label 11 can be compared by the licensors with the information provided from the computerised administration system 30 (such information having been derived from information provided by the clearing houses 15a, 15b, 15c).

It is an important feature of the invention that when a licence applicant applies for a licence in respect of a particular use and for that use is issued with a bundle of licences by different licensors then the unique licence identifier issued for the licence application allows identification of all relevant licences and licensors. Thus the computerised administration system for a single given identifier (for instance provided by clearing houses 15a, 15b, 15c) can identify all relevant licensors who need to be notified.

Figure 4:
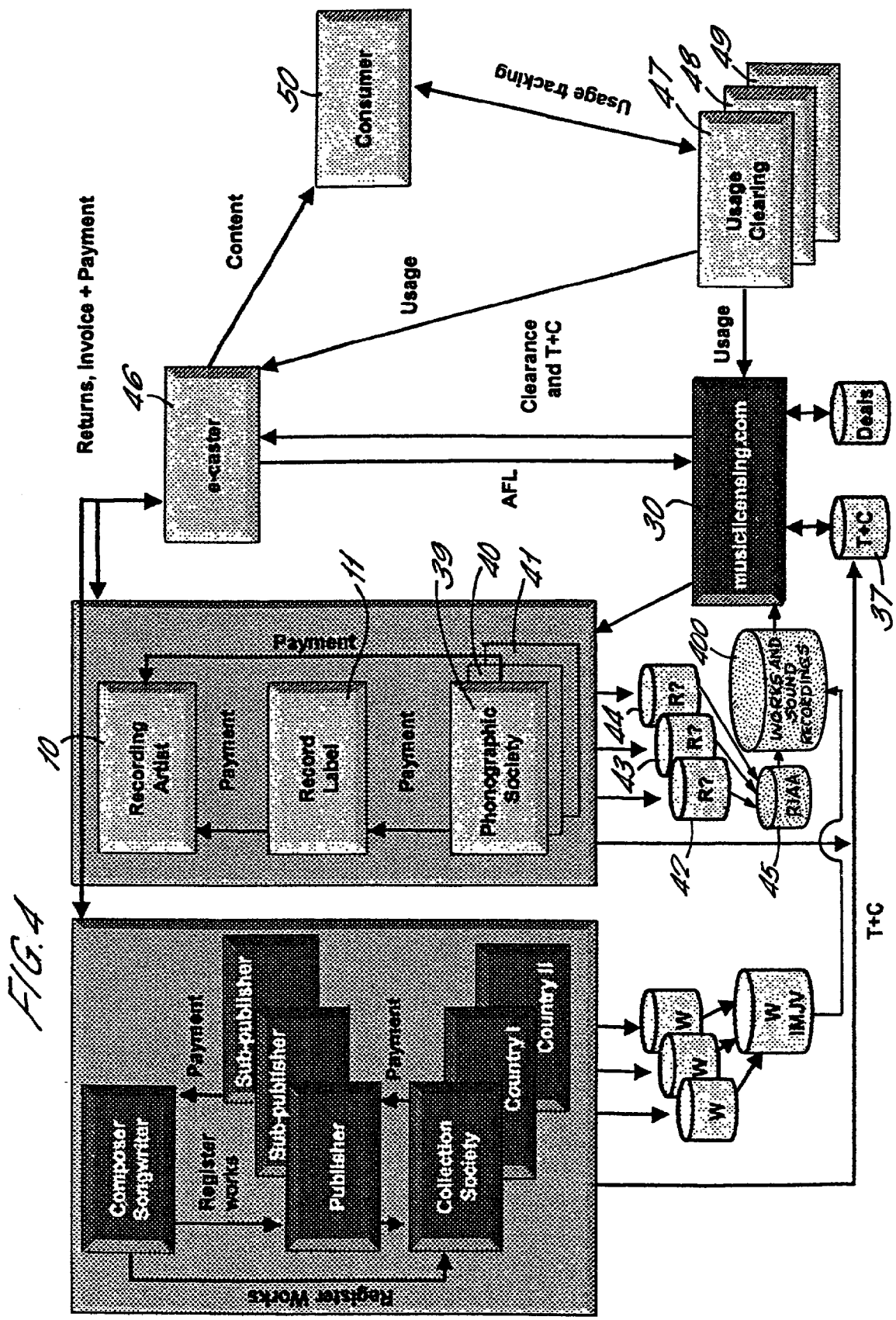
FIG. 4 is a schematic representation of a third embodiment of computerised administration system according to the present invention.

A third variation of system according to the present invention is shown in FIG. 4. This relates to an "e-casting" environment, in other words the situation where a licence is granted to a broadcaster which broadcasts sound recordings via the Internet. In this situation once again the computerised administration system 30 functions as a clearing house acting between licensors and an e-caster and aggregating usage data for the benefit of the licensors. In this model, however, the owners of sound recordings are licensors in the same way as the owners of the copyright in musical works. Therefore, the recording artist 10, the record label 11 and perhaps a phonographic society 39 (representing the interests of the record label 11 and the recording artist 10) can be licensors of sound recordings who inform the computerised administration system 30 of terms and conditions of licences for broadcasting which are available. These terms and conditions are stored in the terms and conditions database 37.

In FIG. 4 it is shown that a number of phonographic societies 39, 40 and 41 exist on a country-by-country basis. Each phonographic society has its own database of sound recordings and the databases can be seen at 42, 43 and 44. For the purposes of the system shown in FIG. 4 a joint venture database 45 is established which accumulates details of the sound recordings as stored in each of three separate databases 42, 43 and 44. However, it should be understood that the joint venture database 45 is not necessary and information could be supplied by the individual phonographic societies or by the individual recording artists and/or record labels. The identification information regarding the sound recordings is relayed form the combined database 45 to the computerised administration system 30. The identification information identifying the sound recordings and the associated licensing is stored in a database 400 of musical works and sound recordings.

An e-caster 46 accesses the computerised administration system 30, typically (as mentioned before) via a website connected to the computerised administration system 30. The e-caster will go through a licensing procedure similar to that shown in FIG. 6. The e-caster 46 will need to obtain an aggregated licence to broadcast, comprising a licence (or licenses) in sound recordings and a licence (or licences) in underlying musical works.

In the FIG. 4 arrangement usage tracking organisations 47, 48 and 49 monitor broadcasts of musical works to consumers 50. The e-caster 46 will be requested to include within the digital transmissions a signal indicating the unique identifier of the licence under which it is operating (perhaps the licence information is recorded as an embedded fingerprint). Therefore, broadcasts of musical works can be tracked by licence and this information can be relayed from the computerised administration system 30 to the owners of copyright in sound recordings, e.g the recording artist 10, the recording labels 11 and/or the photographic societies 39, 40 and 41. This is in addition to the usual relaying of information back to the owners of copyright in the musical works, as described previously. Thus again the system acts to aggregate licences, so that the licence applicant can obtain in one operation all the necessary licences of sound recordings and musical works which it requires and so that the administration system 30 from a single unique identifier can subsequently determine the identities of all relevant licensors.

In each of the systems of FIGS. 2, 3 and 4 the computerised administration system 30 acts as a licensing clearing house for licensors of musical works and sound recordings, allowing them to make their copyright content legally available to digital distributors.

The computerised administration system 30 will allow record labels 11 to search and select works by composer and/or work title, to request a licence for a selected work and to receive a licence for on-line exploitation with corresponding terms and conditions. Furthermore, the system 30 will allow a licence applicant to obtain blanket licences e.g. for a particular geographical territory. The system 30 will allow e.g. a broadcaster to obtain blanket licences from a number of different licensors who own relevant rights in sound recordings and the underlying musical works. In the event that a new request for a licence relates to usage outside the scope of pre-defined licences stored in the database 37 then the licence applicant is referred on to the appropriate licensor.

Above has been described use of copyright material by a record label, which will generally require work-by-work licences of copyright in musical works but will generally not require licenses of sound recordings (the copyright in these generally being the property of the record label). Also, use of copyright material by e-casters has been described and for broadcasting services generally blanket licenses of sound recordings and musical works are required. There is at present considerable effort being expended into developing new ways of delivering recordings of music by Music Service Providers. Five different modes of delivery of music on-line have been mentioned above. Music Service Providers may require blanket licenses of sound recordings or sound-recording-by-sound-recording licenses. Also Music Service Providers may require blanket licenses of musical works or work-by-work licenses.

The computerised administration system 30 offers licensees a central database and a search engine which enables potential licensees to easily access licence information including terms and conditions.

The computerised administration system 30 acts as an independent recorder of licensing deals which are concluded. The computerised administration system 30 registers and stores data relating to licences agreed, this information including the date of the licensing agreement, the identification of the copyright material, the parties to the agreement, the terms and conditions and also a unique identifier number. This record is available to all parties to agreements, the record companies, the publishers and the broadcasters. As mentioned previously a unique licence identifier allocated to a particular licence application may identify several different licences (e.g. under musical works and sound recordings) from several different licensors.

The computerised administration system 30 can provide to licensors at regular intervals details of total usage relating to each licence agreement so that invoices can be raised or a licensee's accounting checked.

The recorded information stored by the computerised administration system 30 can also prepare periodic reports and charts for the whole music industry.

The computerised administration system 30 in issuing a unique identifying number to each licence would bring some standardisation to licence identification potentially for a huge range of musical works and sound recordings and other digital content in the future. The identifying number can then be included in watermarks embedded in delivered digital music files.

Figure 6:
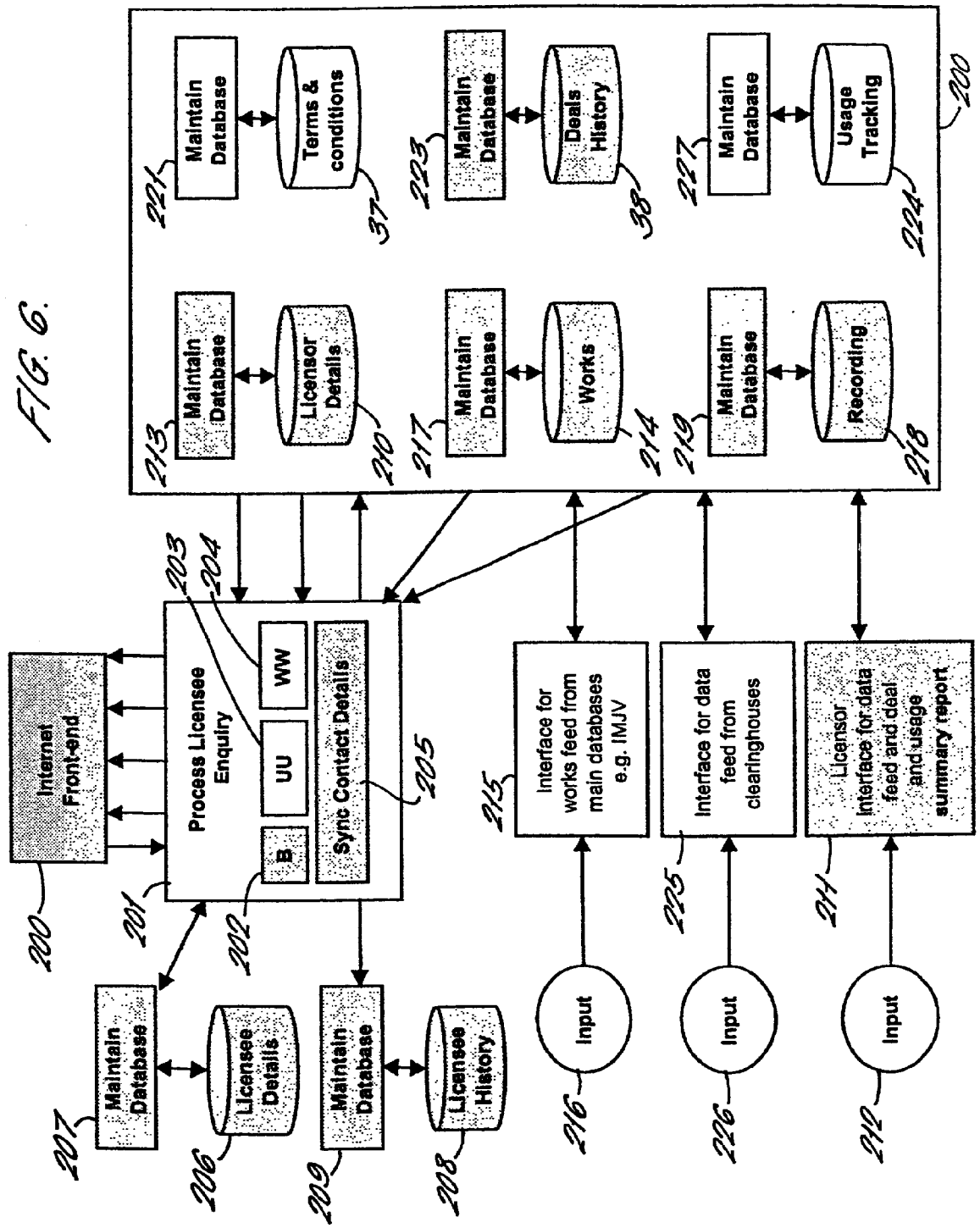
FIG. 6 is a diagram showing interchange of information within to the computerised administration system according to any one of FIGS. 2 to 4.

To initially set up the computerised administration system 30 the databases must be populated with details of copyright works and sound recordings and also with details of terms and conditions and details of licensors. Thereafter, the licensor data, the copyright material data and the terms and conditions data must be maintained, the deals database must be regularly updated and the licence usage reporting must be carried out regularly. To each licensee information must be provided regarding the identity of relevant licensors and the processing of licence applications as can be seen in FIG. 6. FIG. 6 shows the various interfaces and component parts of the computerised administration system as now described.

FIG. 6 shows an Internet front-end 200 which is the main gateway for licensees to access the services of the computerised administration system 30. The licensees will be able to register on-line and send applications for licences on line.

At 201 there is shown enquiry processing. In this processing function there is processing of licence enquiries for blanket licences at 202, use-by-use licences at 203 and work-by-work licences at 204. Contact details for licensors are held at 205 so that the applicant for a licence can be referred on to a licensor for licence negotiations if necessary.

At 206 the licensee database is shown and in this database is stored the information which a licence applicant inputs upon initial registration. The details stored will include, for example, an individual's name, title, company and contact details along with a unique user ID. Each licence applicant will be prompted to confirm and update this information on successive visits. This maintenance function is shown at Step 207.

At 208 is shown a database with a history of every request for a licence which has been received recorded with reference to the licence applicant making the request no matter what type of licence. The process of updating this database is shown at 209.

The database of licensor information is shown at 210. The licensors will register on-line with the computerised administration system 30 via a licensor interface 211. This can comprise a page in a secure area of a website. The step of the licensor inputting data is shown at 212 and the maintenance and updating of data is shown at 213.

A database 214 of copyright material is populated with information from individual publishers or from collection society databases e.g. 31, 32, 33 and 34 and will include only sufficient details to allow for unique identification of the copyright material and the relevant licensors. Typically, individual entries for musical works would include title, composer, licensor and a unique works reference number. Regular updates will ensure that new entries are added and existing data updated. At 215 there is shown an interface between the computerised administration system 30 and the database of copyright material 34 which is the amalgamation of databases of the collection societies. The step of inputting new information is shown at 216, which is the route by which information is received from the databases 34 and 45. Other updates will be received via interface 212 which will allow individual licensors to supply information. The maintenance of the database is shown at 217.

A sound recordings database 218 can be seen in FIG. 6. Details of sound recordings are uploaded from photographic society databases, through the interface 215, or directly from record companies, either through the interface 211 or through the interface 215. The database 218 will be populated by a version of the original database maintained e.g. by a photographic society and will feature e.g. track titles, artists names, copyright owners and unique sound recording reference numbers. Regular updates will ensure that new entries are added and the existing data updated. This step is shown at 219.

The terms and conditions database 37 is shown in FIG. 6. The licensors will supply via the interface 211 terms and conditions for particular types of use of music. These terms and conditions will be matched up and related to particular copyright material. Each musical work database entry and sound recording database entry will be linked to both a licensor database entry and the associated terms and conditions database entry within a single database. The terms and conditions will be sent to a licensee after a successful licence application. The steps of inputting and of updating terms and conditions of licences are shown at 212 and at 221.

The "deals" database 38 is shown in FIG. 6 and successful licensing requests are recorded and stored in this database. Individual files will be matched with corresponding usage tracking data to enable the provision of data regarding use per licence to licensors. The maintenance of the database is shown at 223. This database is updated from the licence application processing procedure 201. Each recorded deal database entry will be linked to a terms and conditions database entry.

It should be appreciated that there will be a myriad of links in the database between database entries concerning licensor details, terms and conditions details, works details, deals histories and sound recording details. For clarity, these links are not specifically shown in FIG. 6 and instead the box 2000 indicates the total database with all the elements within being interlinked. The database record 224 of usage of copyright material will also be interlinked with the other database entries in bod 2000, as will now be described.

The usage tracking database 224 is shown in FIG. 6. Financial clearing houses such as 15a, 15b and 15c will supply detailed data regarding usage of licensed work to the computerised administration system 30. The interface 225 is the interface between the system and the clearing houses 15a, 15b and 15c. The step of inputting the data is shown at 226 and the maintenance of the database is shown at 227. Frequent data supply will enable regular matching with data stored in the history file and the database will be used to supply usage tracking summaries to licensors by use of links with the records of licensors, the records of works and sound recordings and the records of deals.

The supplying of information regarding licences and usage is reported to the licensors via the interface 211. This will typically comprise an automatic on-line feed from the computerised administration system 30 to licensor computer apparatus. The feed will supply a summary of onward referrals of licensees as well as summaries of accepted licence requests and also related tracking figures.

Whilst the above specific description of this application has related to the electronic and/or digital distribution of musical works and sound recordings, the method is also suitable for licensing electronic and/or digital distribution of copyright material such as audio-visual material, photographic material, computer software, games software, musical lyrics, text and graphical material.

The invention claimed is:

1. A method of using a computerised administration system to administer licensing of uses of copyright material, in which at least some uses of the copyright material each require a plurality of different licenses from a plurality of different licensors, the method comprising:

an administrator storing in a database of the computerised administration system information regarding the copyright material available for license, said information having been supplied by a variety of different licensors and said information including identification information identifying for each copyright material the associated plurality of different licensors and licence information specifying terms and conditions of the plurality of licenses needed to license uses of the copyright material; and a plurality of applicants for licences to use the copyright material each using licensee computer apparatus to access and interrogate the database of the computerised administration system to determine the plurality of difference licenses for a particular use of copyright material, who are the relevant plurality of different licensors and what terms and conditions are attached to the relevant licences; wherein:

an applicant for licences uses the licensee computer apparatus thereof to submit an application for licences to the computerised administration system with the licence application specifying a use of copyright material and then the computerised administration system informs the licence applicant of the plurality of licences required and the associated plurality of different licensors;

the licence applicant in the license application by exchange of digital information between the licensee computer apparatus and the computerised administration system acquires from the plurality of different licensors the plurality of licenses required for the specified use of copyright material;

the computerised administration system allocates a unique identifier to the licence application and records in a database of issued licences in respect of each unique identifier details of the licensee, the plurality of licences issued and the relevant licensors; and the licence applicant makes available the licensed copyright material directly to consumers by delivering the copyright material digitally via the telecommunications network to the consumers independently of the administrator and the licence applicant includes the unique identifier in the digitally delivered copyright material.

2. A method as claimed in claim 1, wherein the plurality of licensors each use licensor computer apparatus to transmit digitally via a telecommunications network to the computerised administration system information regarding copyright material available for licence and the computerised administration system stores in the database the transmitted information without storing the copyright material itself.

3. A method as claimed in claim 2, wherein the computerised administration system is physically remote from the licensor computer apparatus.

4. A method as claimed in claim 3, wherein the computerised administration system is physically remote from the licensee computer apparatus and wherein the licensee computer apparatus and the computerised administration system communicate via a telecommunications network.

5. A method as claimed in claim 1 wherein a computerised monitoring system is used to track use of the licensed copyright material by the consumers and relays information regarding the tracked use digitally to the computerised administration system, such information including details of unique identifiers associated with the tracked copyright material, and wherein the computerised administration system uses the received unique identifiers to determine which licences are relevant to the tracked use and therefore which licensors are relevant and then the computerised administration system notifies the relevant licensors of the tracked use by making such information accessible via a telecommunications network to licensor computer apparatus of the licensors.

6. A method as claimed in claim 5 wherein the licence applicant, when licensed to do so, makes available directly to the consumers digital file downloads containing the copyright material for storage in memory means of consumer computer apparatus.

7. A method as claimed in claim 6 wherein each downloaded digital file becomes inactive after a period specified by the licence applicant.

8. A method as claimed in claim 6 wherein each downloaded digital file become inactive after the file has been accessed a number of times specified by the licence applicant.

9. A method as claimed in claim 5 wherein the licence applicant, when licensed to do so, broadcasts the copyright material digitally across the telecommunications network, such broadcast being receivable by consumers using consumer computer apparatus.

10. A method as claimed in claim 5 wherein the licence applicant, when licensed to do so, delivers the copyright material digitally to consumer computer apparatus for immediate use without the possibility of storage of delivered copyright material on the consumer computer apparatus.

11. A method as claimed in claim 10 wherein the copyright material is delivered by the licence applicant to the consumer when demanded by the consumer sending a request digitally to the licence applicant via the telecommunications network.

12. A method as claimed in claim 1 wherein each of the applicants for licences enters into the plurality of licences with the plurality of licensors by reviewing the terms and conditions stored in the database of the computerised administration system and then agreeing to take the licences under a set of terms and conditions by communicating acceptance of the terms and conditions digitally via the telecommunications network to the computerised administration system.

13. A method as claimed in claim 1 wherein the copyright material comprises musical works and the applicants for licences apply for licences to deliver digital sound files including the musical work to consumers.

14. A method as claimed in claim 4 wherein the telecommunications network used is an open telecommunications network.

15. A method as claimed in claim 14 wherein the telecommunications network is the Internet.

16. A method as claimed in claim 15 wherein the computerised administration system is connected to a website on the Internet and licence applicants each use, the licensee computer apparatus thereof to access the website in order to access and interrogate the database and submit requests for licences.

17. A method as claimed in claim 2 wherein the computerised administration system is connected to a website on the Internet and the licensors each use the licensor computer apparatus thereof to access the website in order to transmit digitally the information regarding the copyright material.

18. A method as claimed in claim 5 wherein the telecommunications network is the Internet, the computerised administration system is connected to a website on the Internet and the licensors each use licensor computer apparatus thereof to access the website in order to obtain information regarding the use of licensed material under each licence.

19. A method as claimed in claim 5 wherein the telecommunications network is the Internet, the computerised administration system is connected to a website in the Internet and the licensors each use licensor computer apparatus thereof to access the website in order to obtain information regarding use of licensed copyright material under each licence.

20. Use of computer apparatus as the licensor computer apparatus in the method of claim 2.

21. Use of computer apparatus as the computerised administration system in the method of claim 1.

22. Use of computer apparatus as the licensee computer apparatus in the method of claim 1.

* * * * *